May 23, 1961 J. BRANDS 2,985,302
MEANS FOR SEPARATING FOREIGN MATTER FROM FEED
Filed March 10, 1958 2 Sheets-Sheet 1
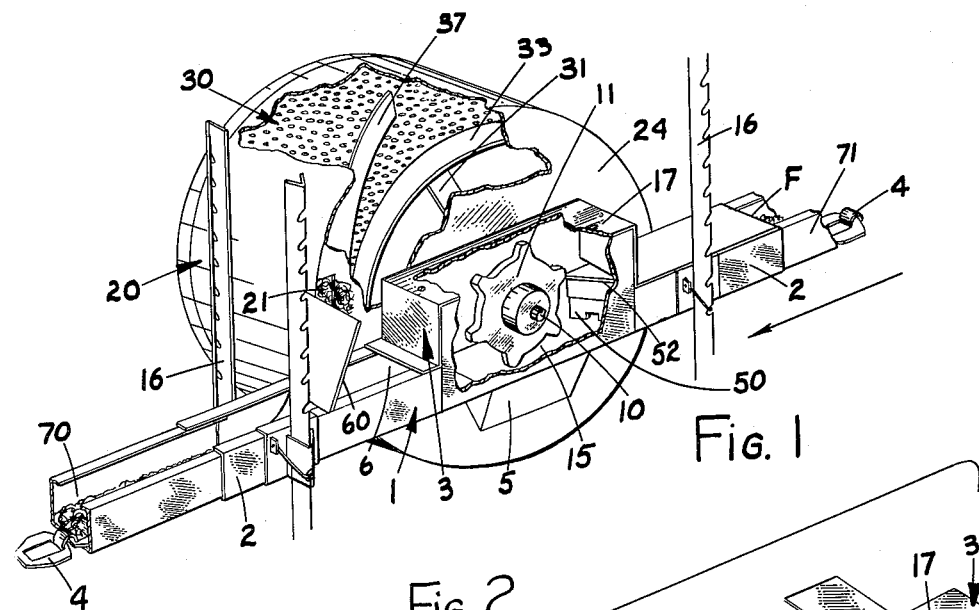
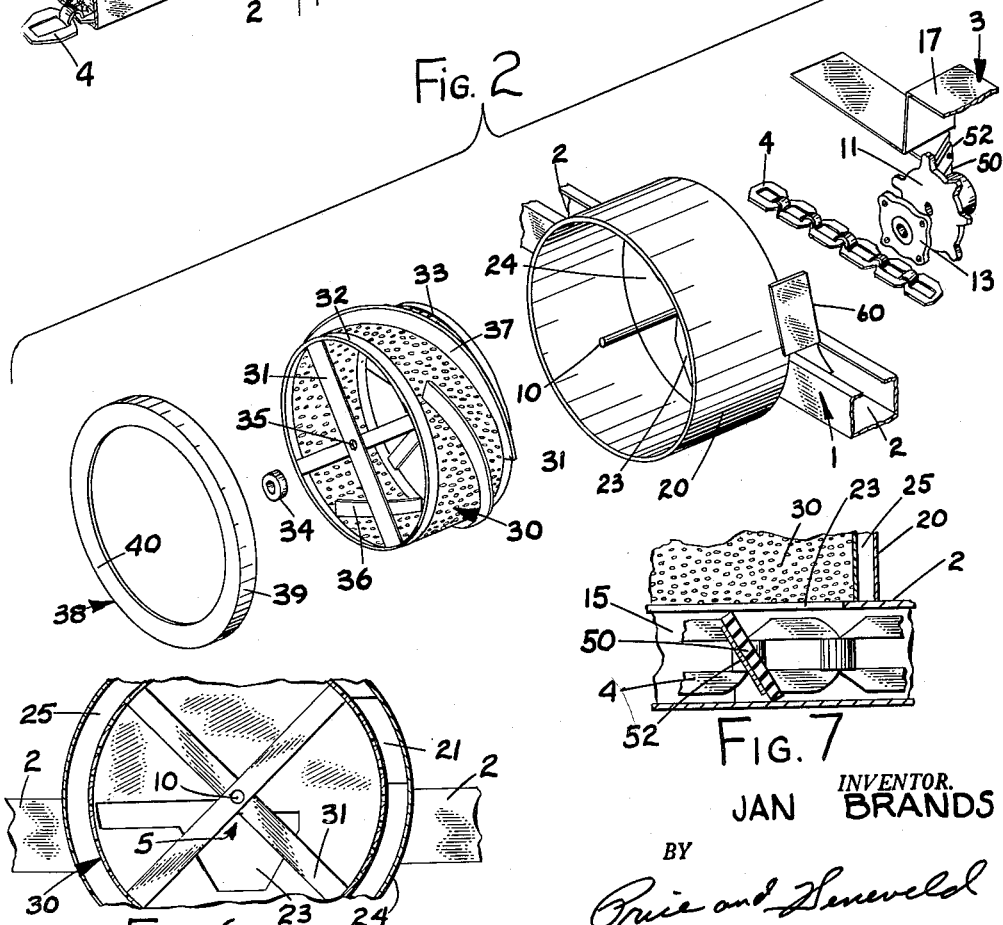
INVENTOR.
JAN BRANDS May 23, 1961 J. BRANDS 2,985,302
MEANS FOR SEPARATING FOREIGN MATTER FROM FEED
Filed March 10, 1958 2 Sheets-Sheet 2

INVENTOR.
JAN BRANDS
BY
Price and Heneveld
ATTORNEYS

United States Patent Office 2,985,302
Patented May 23, 1961

2,985,302
MEANS FOR SEPARATING FOREIGN MATTER FROM FEED
Jan Brands, Zeeland, Mich., assignor to Automatic Poultry Feeder Company, Zeeland, Mich., a corporation of Michigan
Filed Mar. 10, 1958, Ser. No. 720,206
3 Claims. (Cl. 209—235)

This invention relates to means for separating foreign material from feed. More particularly this invention relates to means for separating foreign material from feed such means being adapted to be used in combination with power driven feeding equipment having a trough tracing a closed path with a feed distributor means moving through the trough.

In feeders of this type, one always encounters the problem of bedding, droppings and other foreign matter falling into the trough with the feed. The whole mixture of feed and foreign matter travels along the trough and as more foreign matter finds its way into the trough, the feed soon becomes so saturated with non-edible material that the trough must be cleaned to allow the feeding system to operate effectively. This cleaning operation is very time consuming and difficult to carry out as all the material must be removed from the trough and then the foreign matter must be removed from the feed.

Attempts have been made in the past to automatically accomplish this separation. Various combinations of pushing the mixture from the trough into a screen rotated by a complicated series of gears and shafts, having buckets or cups to transfer the feed from a well to a chute back into the trough have been constructed. These devices are costly to construct, difficult to assemble and rough in operation. Their structure is such that a great deal of power is needed to operate them because of the necessity of moving the feed over a relatively large distance. This causes wear and tear on all parts involved and lowers the efficiency of the device.

An object of this invention is to provide a separating means which is very economical to construct, easy to assemble, and smooth in operation.

Another object of this invention is to provide a separating means utilizing an absolute minimum of driving parts and connections thereby also assuring smoother operation.

Still another object is to provide a separating means which utilizes to full advantage the effect of gravity in moving the mixture.

A further object is to provide a separating means which redelivers the cleaned feed to the conveyor in the simplest manner possible.

These and other objects and purposes of my invention will be readily seen by those acquainted with the construction of automatic feeders upon reading the following specification and accompanying drawings.

In the drawings:
Fig. 1 is a side elevational, oblique view of my separating means in combination with an endless conveyor, certain parts thereof being broken away to show certain features of my invention.

Fig. 2 is an exploded oblique view of my invention.

Fig. 6 is a cross sectional view taken along the plane VI—VI of Fig. 4.

Fig. 7 is a cross sectional view taken along the plane VII—VII of Fig. 5.

Figure 3:
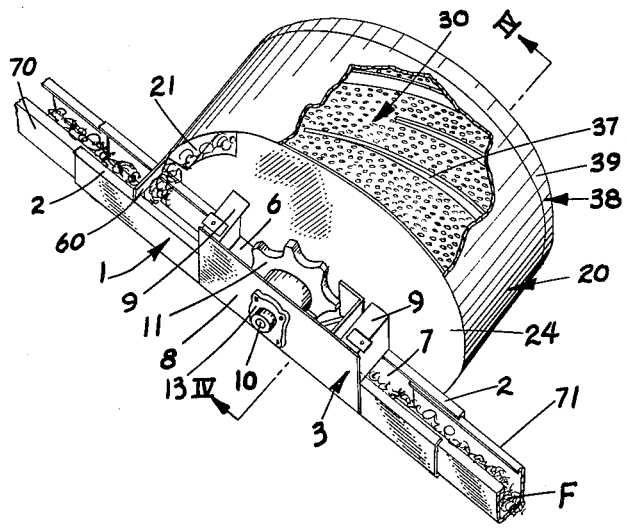
Fig. 3 is a top, side, perspective view of my separating means in combination with an endless conveyor, certain parts thereof being broken away to show certain features of my invention.

Briefly this invention relates to a means for separating foreign matter from feed adapted to be used with powered feeding equipment of the type having a trough tracing a closed path with an endless chain driven in the trough. My separator is comprised first of a shaft mounted across the trough, with a sprocket wheel engaging the moving chain and a rotary, cylindrical screen mounted on the shaft adjacent to the trough. A drum of larger diameter than the cylindrical screen is mounted adjacent the trough and envelops the screen. The drum has an opening in the side away from the trough through which foreign matter is moved by conveying means on the inside of the screen. An opening in the side of the drum adjacent the trough allows the mixture of feed and foreign matter to fall through the side of the drum from the trough. A hard rubber baffle placed over the chain forces the mixture therethrough. A chute communicates with an opening in the bottom of the trough, allowing the mixture of feed and foreign matter which does not fall through the side of the drum to drop through the opening into the chute and down into the screen. Helical blades are mounted on the outside of the cylindrical screen and are so arranged that as the feed sifts through the rotating screen it is forced to the side of the drum next to the trough and after the screen rotates a predetermined number of degrees, the feed will be forced through another opening in the side of the drum adjacent the trough, back into the trough downstream of the opening after which it continues along the feeding line.

Referring to the drawings, reference numeral 1 designates a trough section including the trough ends 2 and a housing 3 located intermediately the ends. The trough section is adapted to be connected in a continuous, endless trough feeder, represented by trough ends 70 and 71, in which the chain 4, for distributing feed F, is driven by any one of a number of suitable power driven means well known in the art. The trough section has chute 5 communicating with a trough opening below the housing 3. Attached to the side of the trough is a drum 20 enveloping a rotatable, cylindrical screen 30 of slightly smaller diameter than the drum. The cylindrical screen is rotatably mounted in the drum by a shaft 10 journaled in bearings supported by the trough section. Sprocket 11 is secured to the shaft 10 for driving it. This sprocket engages the chain 4 so that the movement of chain 4 through the trough rotates the shaft 10 which in turn rotates the cylindrical screen 30. As will become apparent by the following description, this feed cleaner operates by forcing most of the mixture of feed and foreign matter from the trough through the side of the drum by a rubber baffle and the remainder dropping through chute 5 into the screen 30 where the feed and litter is separated. The feed passes through the screen 30 into a space between the drum 20 and a screen 30 and then is carried upwardly and lengthwise of the drum through the opening 21 in the side of the drum 20.

Describing each of the parts of my invention in more detail, it will be seen that the trough section includes the trough ends 2 of conventional form supported above the floor by the leg supports 16. Mounted to move in a closed path through the trough is the endless chain 4 adapted to move the feed along the trough. Located intermediate the trough ends 2 and integral therewith is the housing 3 formed by the drum 20, side plate 8 and cover 17 which is mounted on supports 9 (Fig. 3). The housing provides openings 6 and 7 communicating with the trough ends 2. The bottom of the trough at housing 3 has an opening 15 (Figs. 4 and 5) extending the entire width of the trough and communicating with chute 5, connected to the bottom of housing. Chute 5 communicates with the screen 30. Thus, all feed moving along trough section 1 will be discharged into the screen. Attached to housing 3 at a point just above the opening 7 by bracket 52 is a baffle 50. This baffle is preferably constructed of hard rubber or other yielding material and positioned just above the chain 4 and adjacent opening 23 in the side of the drum adjacent the trough. The baffle is positioned at an angle to the plane of the opening 7 such that as the chain 4 strikes the baffle, the mixture of feed and foreign matter riding on it is forced towards the opening 23 just after it enters opening 7 and, thus onto the screen within the drum. Any of the mixture escaping the baffle will drop into chute 5 and then onto the screen.

Attached to the side of the trough section 1 adjacent the housing 3 is the drum 20. The side of the drum 20 away from the trough is open and the side 24 of drum 20 adjacent the trough is closed, except for openings 21 and 23. Opening 21 is positioned at the outer periphery of drum 20, above the level of the trough and downstream of chute 5 (Figs. 1 and 3). Opening 23 is positioned so that it communicates with the housing 3. The function of these openings will be described hereinafter.

The shaft 10 is rotatably mounted in the housing 3 by bearings 13, one attached to the side plate 8 of housing 3 (Fig. 3) and the other to the closed end 24 of drum 20. The free end of shaft 10 extends through the center of the drum 20. A sprocket wheel 11 is mounted on shaft 10 between bearings 13 directly above chain 4 so that it engages the chain. Mounted both downstream and upstream of opening 15 in the bottom of the trough section are guides 51 which center the chain in the chute facilitating its engagement with sprocket wheel 11 at all times.

Mounted on the free end of shaft 10 extending through the center of drum 20 is the rotary, cylindrical screen 30 having a diameter slightly smaller than that of the drum. The screen consists of a metal sheet perforated and bent to form a pair of end rings or rims 32 and 33 braced by radial spokes 31 (Fig. 2). The sides of the screen between the rims are selectively perforated to pass the dry feed material but retain material having a larger particle size such as litter. Separate rim members may be provided and a metallic screen substituted for the one-piece perforate sheet metal member just described.

Figures 4, 5:
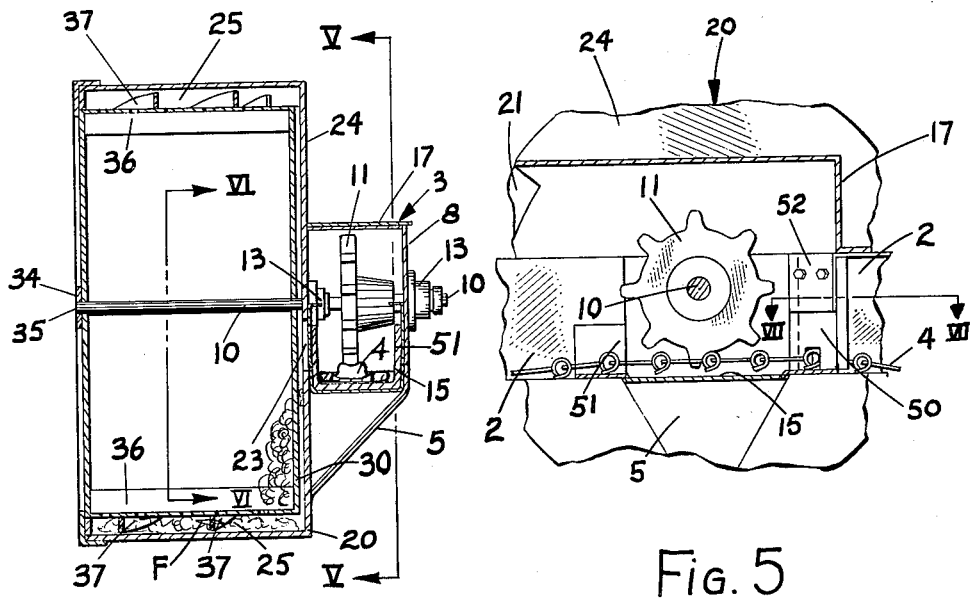
Fig. 4 is a front, elevational, cross-sectional view taken along the plane IV—IV of Fig. 3.
Fig. 5 is a cross sectional view taken along the plane V—V of Fig. 4.

The screen 30 is fixedly mounted on the shaft 10 at the cross point 35 of spokes 31 by a collar 34. When mounted on shaft 10 inside drum 20, the screen 30 is concentric with drum 20 and spaced therefrom providing a space 25 therebetween (Fig. 4). It is now observed that as the moving chain 4 engages the sprocket wheel 5, the shaft 10 will be rotated, in turn causing the screen 30 to rotate inside the drum 20.

On the inside of screen 30 are the blade members 36 (Figs. 2 and 4) mounted on and angularly disposed relative to the axis of the screen. The ends of blades 36 nearest rim 32 are angularly displaced, relative to the direction of rotation of the screen, behind the ends nearest rim 33. Thus, material remaining inside the drum is moved toward the open end of drum 20 by the blade members 36. Attached to the outside of screen 30 and extending into the space 25 between the screen and drum 20 are the helical blade members 37. The ends of the blade members 37 are angularly displaced causing the blades to move material between drum 20 and screen 30 toward the trough.

A rim 38 having flanges 39 and 40 is mounted on the drum 20 with flange 39 engaging the peripheral edge of the open end of drum 20. The flange 40 extends radially inwardly a distance equal to the distance of space 25 between the drum and screen. This is to prevent feed from passing out of the open end.

A deflector and leveling plate 60 (Figs. 1 and 3) is located downstream of the opening 21 in the drum 20 for deflecting the feed into the trough and leveling it as it emerges from opening 21 and enters the downstream trough end 2.

*Assembly*

The assembly of my cleaner and its installation on a conventional automatic power feeder having an endless trough with an endless driven chain is simple. The cleaner is completely assembled at the factory except for the four support legs. The factory assembly is as follows.

The trough section 1 is fabricated from a section of a conventional trough in which the opening 15 in the bottom and openings in both sides adjacent the bottom opening are cut. The drum 20 is secured to one side of the trough section by welding or any other suitable means in such a position that its lower peripheral edge is located substantially below the bottom of the trough. The chute 5 is secured between the trough and the drum and communicates with openings 15 and 23. This fabrication can be accomplished by welding, bolts, or any other suitable fastening means. The trough, drum, and chute when assembled are one integral unit.

After assembling the trough, drum, and chute the shaft 10 is rotatably mounted across the trough by securing the bearings 13, one to the center of the side of the drum adjacent the trough and the other to the plate 8 forming a part of the housing 3. This plate 8 covers the open side of the trough opposite to the drum and has secured thereto the support members 9 for mounting the cover 17 (Fig. 1) over the housing. Plate 8 is secured to the side of the trough after the sprocket 11 is keyed to the shaft 10 and the free end of the shaft is inserted through the bearing 13 on the drum. When plate 8 is installed, the other free end of the shaft is received by bearing 13 on the plate 8. This rotatably mounts the sprocket 11 in the proper position for engaging a chain traveling through the trough. Other detail elements may be provided for properly positioning the sprocket in the center of the trough but it is considered unnecessary to describe in detail all of the such positioning elements since they are well within the purview of any skilled mechanic.

The U-shaped chain guides 51 are secured to the bottom of the trough on both sides of the opening 15 of the trough. These chain guides receive the chain and guide the chain into the proper position for engagement by the sprocket 11. The hard rubber baffle 50 is mounted inside the housing 3 by means of bracket 52. This bracket is mounted on the housing 3 just above the opening 7. Bracket 52 positions the baffle 50 within the housing in a manner such that it lies and rides over the chain as the chain is moved through the housing, forcing material carried by the chain through the opening 23 into the screen within the drum. Any material remaining on the chain drops through opening 15 and onto the screen within the drum. The sprocket, shaft, and housing 3 assembly is completed with the installation of the cover 17 over the housing.

The screen 30 is secured onto the free end of the shaft 10 which extends into the drum 20. This is accomplished by inserting the screen over the shaft so that the openings at the crossover points 35 of the spokes 31 receive the shaft and are keyed thereto. The screen is held on the shaft by the collar 34. When thus assembled, the perforated wall of the screen is spaced from the wall of the drum providing the space 25 in which the helical flights or blades 37 operate. The rim 38 is secured onto the open end of the drum with flange 40 extending to the periphery of the screen so as to prevent feed from passing out of the open end of the drum.

Having completed the assembly of the unit itself, the unit is shipped completely assembled except for the leg assemblies 16 which are packed separately. It can be placed anywhere in a conventional feeding system, but gives best results when near the incoming side of a hopper. To install on a conventional endless feeder having troughs corresponding in shape to trough section 52, the chain is disconnected at the spot where the feeder is to be installed and a section of trough is cut out at that location. The cut trough ends 70 and 71 (Fig. 1) of the endless feeder are slipped into the ends 2 of the already assembled cleaner. The chain is then pulled under the sprocket 11 and reconnected. The feeder is then ready to use, its installation taking practically no time at all. Besides the standard screen which handles most feeds, a special pellet screen can be provided.

*Operation*

As the chain 4 moves through the trough, it engages sprocket wheel 11 and thereby causes cylindrical screen 30 to rotate within the drum 20. As chain 4 moves the mixture of feed and foreign matter along in the trough in the direction of the arrow shown in Fig. 1, the baffle 50 forces most of the mixture through the side of the drum and it falls into the interior of the cylindrical screen 30. The rest of the mixture falls through the bottom of housing 3 into chute 5. The force of gravity causes the mixture to fall down through the opening 23 onto the screen 30. The screen is of such a foraminous character that the feed separates from foreign material by dropping through the screen into drum 20, and into the space 25. The foreign matter remaining on the screen is forced out of the open end of drum 20 by blade members 36 as the screen 30 rotates.

The shape and position of helical blade members 37 causes the feed in the drum to be swept with the rotation of screen 30 through the space 25, toward the side 24 of the drum adjacent the trough and up to the opening 21 in the outer periphery of the drum. The force of gravity is again utilized in that the feed will drop through opening 21, and deflector and leveling plate 60 guides it back into the trough from whence it continues along the feeding line.

My apparatus thus achieves the separation of foreign matter from the feed and redelivers the feed to the conveyor in a manner as simple as possible. This is accomplished because this separator utilizes an absolute minimum of driving parts and connections, there being no belts, pulleys or extra chains to cause mechanical trouble. Simplicity and sound design make my separator economical to construct and easy to assemble, and most important of all, smooth operation is assured thereby eliminating breakdowns and inefficiency. This is very important because the apparatus is powered by the movement of the chain through the trough, and great stresses are placed on the chain if there is an excess of driving parts and the force of gravity is not allowed to do its maximum share of the work. In my apparatus, so little power is needed, that no new motor need be installed. Also the chain is under a minimum of strain because of the simplicity of its construction and the full utilization of the force of gravity. My separator will clean mash, pellets, crumbles or grain equally well. It removes litter, shavings, straw, cobs, hulls, droppings and feathers.

I have illustrated and described but one preferred embodiment of my invention. Various modifications of my invention may be made, each without departing from the scope and spirit of my invention. Each of these modifications is to be considered as included in the hereinafter appended claims unless the language of these claims expressly states otherwise.

I claim:

1. Means for separating foreign matter from feed, said means being adapted to be used with powered feeding equipment, said feeding equipment having a trough tracing a closed path, an endless chain in said trough and means for moving said chain along said trough, comprising: a trough section; a rotary, cylindrical screen mounted adjacent said trough section, means to rotate said screen; a drum larger in diameter enveloping said screen and mounted adjacent said trough section, means to transmit mixture of feed and foreign material from said trough section to said screen, means to transmit said foreign matter from said screen; helical blades mounted on the outside of said screen, said blades adapted to move feed dropping through said screen into said drum in a direction upwardly and lengthwise of said drum toward said trough; said drum having an opening in its side, said opening being located adjacent said trough section downstream of said trough opening at the outer periphery of said screen and drum, and above the level of said trough section thereby allowing said feed forced by said blades to said opening to freely fall back into said trough section as said helical blades rotate.

2. Means for separating foreign matter from feed, said means being adapted to be used with powered feeding equipment, said feeding equipment having a trough tracing a closed path, an endless chain in said trough and means for moving said chain along said trough, comprising; a trough section; a rotary, cylindrical screen mounted immediately adjacent said trough section; a drum larger in diameter than said screen, enveloping said screen and mounted adjacent said trough section; means to rotate said screen; a downwardly inclined chute mounted on the bottom of said trough providing communication between an opening in said bottom and a portion of said screen lying generally below said opening, thereby allowing mixture of feed and foreign matter to freely fall from said trough section to said screen; means to transmit said foreign matter from said screen; helical blades mounted on outside of said screen, said blades adapted to move feed dropping through said screen into said drum in a direction upwardly and lengthwise of said drum toward said trough section downstream of said trough opening; said drum having an opening in its side, said opening being located adjacent said trough section at the outer periphery of said screen and drum, and above the level of said trough section, thereby allowing said feed forced by said blades to said opening to freely fall back into said trough section as said helical blades rotate.

3. Means for separating foreign matter from feed, said means being adapted to be used with powered feeding equipment, said feeding equipment having a trough tracing a closed path, an endless chain in said trough and means for moving said chain along saide trough, comprising: a trough section; a shaft mounted across said trough section in bearings for rotational movement, said shaft having a driving sprocket engaging said chain and said shaft having a rotary, cylindrical screen mounted thereon adjacent said trough section; a drum larger in diameter than said screen, enveloping said screen and mounted adjacent said trough section, said drum having a first opening in its side away from said trough section positioned at the inside periphery of said screen; a downwardly inclined chute mounted on the bottom of said trough section providing communication between an opening in said bottom and a portion of said screen lying generally below said opening, thereby allowing mixture of feed and foreign matter to freely fall from said trough section to said screen; a baffle mounted with said trough section lying in the path of said mixture moving along said chain, said baffle forcing said feed downward onto said screen; conveyor means located at the inside of said screen for forcing separated foreign matter to said first opening of said drum, helical blades mounted on the outside of said screen, said blades adapted to move feed dropping through said screen into said drum in a direction upwardly and lengthwise toward said trough section downstream of said trough opening; said drum having a second opening in its side, said second opening being located adjacent said trough section, at the outer periphery of said screen and drum, and above the level of said trough, thereby allowing said feed forced by said blades to said second opening to fall freely back into said trough section as said helical blades rotate.

References Cited in the file of this patent

UNITED STATES PATENTS

| | | |
|---|---|---|
| 2,709,520 | Stark | May 31, 1955 |
| 2,742,020 | Smallegan | Apr. 17, 1956 |
| 2,806,447 | Bryan et al. | Sept. 17, 1957 |
| 2,806,600 | Bryan et al. | Sept. 17, 1957 |
| 2,821,961 | Mercoli | Feb. 4, 1958 |